(12) United States Patent
Miller et al.

(10) Patent No.: US 7,532,379 B2
(45) Date of Patent: May 12, 2009

(54) OPTICAL MODULATOR WITH SIDE ACCESS

(75) Inventors: David A. B. Miller, Stanford, CA (US); Jonathan E. Roth, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 417 days.

(21) Appl. No.: 11/524,498

(22) Filed: Sep. 19, 2006

(65) Prior Publication Data
US 2009/0086302 A1    Apr. 2, 2009

Related U.S. Application Data

(60) Provisional application No. 60/718,427, filed on Sep. 19, 2005.

(51) Int. Cl.
G02F 1/03   (2006.01)
G02F 1/035  (2006.01)
G02F 1/295  (2006.01)

(52) U.S. Cl. ............... 359/245; 359/247; 359/248; 359/261; 359/263; 385/2; 385/8

(58) Field of Classification Search .......... 359/237, 359/245–248, 251, 261, 263, 276, 279; 385/1–4, 385/8
See application file for complete search history.

(56) References Cited

U.S. PATENT DOCUMENTS

| | | | |
|---|---|---|---|
| 4,525,687 A | 6/1985 | Chemla et al. | |
| 5,488,504 A | 1/1996 | Worchesky et al. | |
| 5,522,005 A | 5/1996 | Moretti et al. | |
| 5,886,361 A | 3/1999 | Presting et al. | |
| 5,966,234 A * | 10/1999 | Ford et al. | 359/248 |
| 6,215,577 B1 * | 4/2001 | Koehl et al. | 359/261 |
| 6,268,953 B1 * | 7/2001 | Maloney | 359/321 |
| 6,784,466 B2 | 8/2004 | Chu et al. | |
| 2005/0141801 A1 | 6/2005 | Gardner | |

OTHER PUBLICATIONS

Richard A. Soref et al., "Silicon-based group IV heterostructures for optoelectronic applications," J. Vac. Sci. Techno. A 14(3). May/Jun. 1996, pp. 913-918.
Noah C. Helman et al., "Misalignment-Tolerant Surface-Normal Low-Voltage Modulator for Optical Interconnects," IEEE Journal of Selected Topics in Quantum Electronics, vol. 11, No. 2, Mar./Apr. 2005, pp. 338-342.

* cited by examiner

Primary Examiner—Ricky L Mack
Assistant Examiner—Jack Dinh
(74) Attorney, Agent, or Firm—Lumen Patent Firm

(57) ABSTRACT

An electro-optic semiconductor device (e.g., an optical modulator) having side access and beam propagation within the device is provided. Side access for the optical input and/or output facilitates disposition of electronic circuitry and/or heat sinking structures on the top and bottom surfaces of the modulator. Internal beam propagation instead of internal waveguiding advantageously simplifies optical coupling and alignment to the modulator. Interaction length within the device is preferably enhanced by passing through the device active region at a relatively shallow angle. The internally propagating beam is reflected from a reflective face parallel to the device active region. The side faces can be perpendicular or tilted with respect to the reflective face. Tilted side faces are preferably tilted to provide external beam paths parallel to the reflective face. Internal reflection from an angled side face can be employed to provide configurations having one side port and one top or bottom port.

24 Claims, 2 Drawing Sheets

OPTICAL MODULATOR WITH SIDE ACCESS

CROSS REFERENCE TO RELATED APPLICATIONS

This application claims the benefit of U.S. provisional application 60/718,427, filed on Sep. 19, 2005, entitled "Optical Modulator with Side Access", and hereby incorporated by reference in its entirety. This application also claims the benefit of U.S. application Ser. No. 11/230,285, filed on Sep. 19, 2005. U.S. application Ser. No. 11/230,285 claims the benefit of U.S. provisional application 60/635,093, filed on Dec. 9, 2004.

GOVERNMENT SPONSORSHIP

This invention was made with Government support under grant number W911NF-05-1-0251 (PTA number 194674-601-TBABC) from DARPA/Army Research Office. The Government has certain rights in this invention.

FIELD OF THE INVENTION

This invention relates to optical modulators.

BACKGROUND

Semiconductor optical modulators can provide high speed modulation in combination with low voltage and power requirements. Such modulators are of interest for various applications, such as telecommunications and optical interconnects for large scale electronic integrated circuits.

Accordingly, optical modulators have been extensively investigated in the art. Semiconductor modulators often include quantum wells in the device active region to improve modulation performance. It is customary to classify such modulators according to the geometrical relation between the light being modulated and the quantum wells. One possibility is to have light propagating essentially perpendicular to the quantum wells, e.g., as considered in U.S. Pat. No. 4,525,687. Such surface normal devices have short interaction lengths, which undesirably increases modulator switching voltage. In many cases, the resulting modulator switching voltages are sufficiently high that the device is not compatible with mainstream electronics (e.g., silicon CMOS). Surface normal devices disposed in a vertical optical resonator to improve modulator performance have been considered, e.g., in U.S. Pat. No. 5,488,504.

Another possibility is to have light propagating in the plane of the quantum wells. Long interaction lengths can be obtained in this geometry, typically by including the quantum well active region in an single mode optical waveguide, e.g., as considered in U.S. Pat. No. 5,522,005. However, coupling into such single mode waveguides raises considerable difficulties in practice. In particular, the small mode size and differing horizontal and vertical divergence angles typical of semiconductor waveguides create significant complications for input and output coupling (e.g., to optical fibers).

It is also possible for the light to propagate through the modulator active region at a shallow angle with respect to the quantum wells. A quasi-waveguide angled-facet electroabsorption modulator (QWAFEM) has been considered by Helman et al. in an article "Misalignment-Tolerant Surface Normal Low-Voltage Modulator for Optical Interconnects" (IEEE JSTQE, 11(2), pp 338-342, March/April 2005). In a QWAFEM, light is coupled into and out of the device via the top surface. Within the device, internal reflections from angled faces define an optical beam path that passes through the quantum well region at a shallow angle. The active region is parallel to a bottom surface of the device, which also acts as an internal reflector defining the optical beam path. Thus a QWAFEM provides a longer interaction length than conventional surface normal devices, without coupling to a single mode semiconductor waveguide.

Although the surface normal input and output coupling characteristic of QWAFEMs can be advantageous in certain cases (e.g., for free space optical interconnects), it can also be disadvantageous. For example, it is often desirable to integrate optical modulators with conventional electronic circuitry. Typically, the top surface of a conventional integrated circuit is employed for making electrical connections and the bottom surface is employed for removing heat, or vice versa. Thus performing optical coupling via the top or bottom surfaces of a modulator can undesirably interfere with electrical connections and/or heat removal.

Accordingly, it would be an advance in the art to provide an optical modulator having increased interaction length without waveguiding and without requiring surface normal coupling.

SUMMARY

To address the above-identified issues, an electro-optic semiconductor device (e.g., an optical modulator) having side access and beam propagation within the device is provided. Providing side access for the optical input and/or output facilitates disposition of electronic circuitry and/or heat sinking structures on the top and bottom surfaces of the modulator. Providing internal beam propagation instead of internal waveguiding advantageously simplifies optical coupling and alignment to the modulator. Interaction length within the device is preferably enhanced by having the internally propagating beam pass through the device active region at a relatively shallow angle. The internally propagating beam is reflected from a reflective face parallel to the device active region. The side faces can be perpendicular to the reflective face, or they can be tilted with respect to the reflective face. Tilted side faces preferably have a tilt angle selected to provide an external beam path for input and/or output that is parallel to the reflective face. Internal reflection from an angled side face can be employed to provide input (or output) coupling from the top or bottom surface of the device, the other optical port being through a side face.

DETAILED DESCRIPTION

Figure 1:
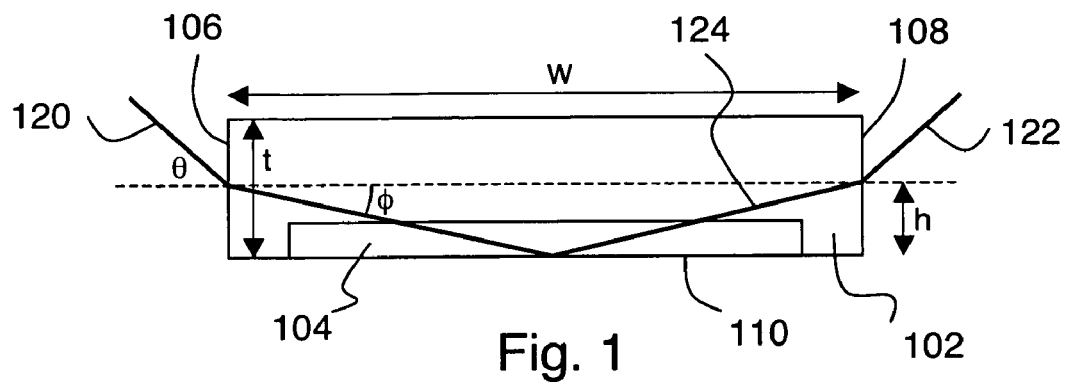
FIG. 1 shows an optical modulator according to a first embodiment of the invention.

FIG. 1 shows an electro-optic semiconductor device (e.g., an optical modulator) according to a first embodiment of the invention. A beam propagation structure 102 includes a modulator active region 104. Active region 104 has an optical response that can be altered by varying an electric field in the active region. The optical response can act to alter the amplitude and/or phase of light passing through the active region. The physical mechanism (or mechanisms) relating the optical response to the electric field can be any electro-optic effect, including but not limited to: the quantum confined Stark effect, the Wannier-Stark effect, the Franz-Keldysh effect, electro-absorption, electro-refraction, or any combination of these. Active region 104 is disposed substantially parallel to an internally reflective face 110 of the beam propagation structure. Beam propagation structure 102 has an input optical face 106 and an output optical face 108. Input optical face 106 and output optical face 108 are distinct faces (i.e., they do not lie in the same plane).

Active region 104 can be any semiconductor structure providing an electro-optic response, fabricated in any semiconductor material system. Beam propagation structure 102 can be made of any material having sufficiently low optical loss, and is preferably made of a material that is fabrication-compatible with active region 104. Electronic circuits can be fabricated in or on beam propagation structure 102, and such circuits may provide electrical control or biasing of active region 104.

Beam propagation structure 102 defines an internal optical beam path 124 extending from input face 106 to output face 108. Internal beam path 124 defines external optical beam paths 120 and 122 at the input and output respectively. Typically, there is significant refraction at the input and output faces, as shown, since beam propagation structure 102 is typically a semiconductor having a refractive index much larger than that of the surrounding medium, which is typically air. Internal optical beam path 124 includes a reflection from internally reflective face 110 at an oblique angle of incidence. The angle of incidence at reflective face 110 is preferably between about 60 degrees and about 80 degrees.

Operation at angles of incidence less than about 60 degrees is not preferred, since the interaction length enhancement in this case is undesirably less than a factor of about two, compared to normal incidence operation of the same active region. Operation at angles of incidence greater than about 80 degrees is not preferred because the beam spot size on the device can become undesirably large, and because the ability to tune to resonance is undesirably degraded at grazing incidence due to angular spread of the beam. This reflection can be provided by total internal reflection from face 110, or it can be provided by a reflective coating (not shown) applied to face 110, such as a metallic coating or a multi-layer dielectric coating. In some cases, (e.g. a SiGe active region on a Si substrate) active region 104 can have a different refractive index than beam propagation structure 102. The preceding description of preferred angles of incidence relates specifically to the angle of incidence at reflective face 110 (i.e., the angle within active region 104).

At least one of input and output faces 106 and 108 is not parallel with internally reflective face 110. Also, the internal optical beam path 124 makes an oblique angle with respect to at least one of the input and output optical faces. In the embodiment of FIG. 1, the input and output faces are at the sides of the device as opposed to the top or bottom, and are both perpendicular to reflective face 110. Such vertical side faces can be fabricated in various ways, e.g., by etching, and are preferably fabricated by cleaving in cases where the materials employed provide suitable cleavage planes. Typical semiconductor substrates, such as <100> GaAs and <100> InP can provide such cleavage planes.

It is preferred to minimize reflection loss at input face 106 and output face 108. Such reflection loss can be reduced in several ways. One method is to provide a suitable anti-reflection coating on faces 106 and 108. Another method is to provide input light to the modulator that is TM polarized with respect to input face 106 and incident at the Brewster angle. If the Brewster condition ($\tan\theta=n_t/n_i$, for incidence on a medium of index $n_t$ from a medium having index $n_i$) is satisfied or nearly satisfied, then reflection loss is zero or small. In the geometry of FIG. 1, symmetry ensures satisfaction of the Brewster condition at output face 108 if it is satisfied at input face 106. For $n_i=1$ and $n_t=3.5$ (typical for a semiconductor), $\theta=74°$ satisfies the Brewster condition. Although the example of FIG. 1 shows input face 106 and output face 108, practice of the invention does not critically depend on which face is the input face and which face is the output face. Input and output can be generally be interchanged in this and all other embodiments of the invention.

As an illustrative design example, consider a semiconductor chip having a thickness t of about 500 μm and a length w of 3 mm. Refractive indices of semiconductors such as GaAs, InP, Si, and Ge are typically in the range of about 3 to about 4.5 at operating wavelengths of semiconductor modulators. For this example, we take n=3.5 and $\theta=45°$. From Snell's law, the transmitted angle $\phi=11.7°$. If optical path 124 is centered with respect to the chip length (which is preferred, but not required), then the entrance and exit height $h=(w/2)\tan\phi$ is about 310 μm, which is well within the chip thickness. In a simple model, the effective interaction length is increased by a factor of about $1/\sin\phi$ (which is about 5 in this example), compared to a conventional surface-normal modulator. This increased optical path length is helpful for reducing the modulator drive voltage required to obtain a given modulation depth.

Figure 2:
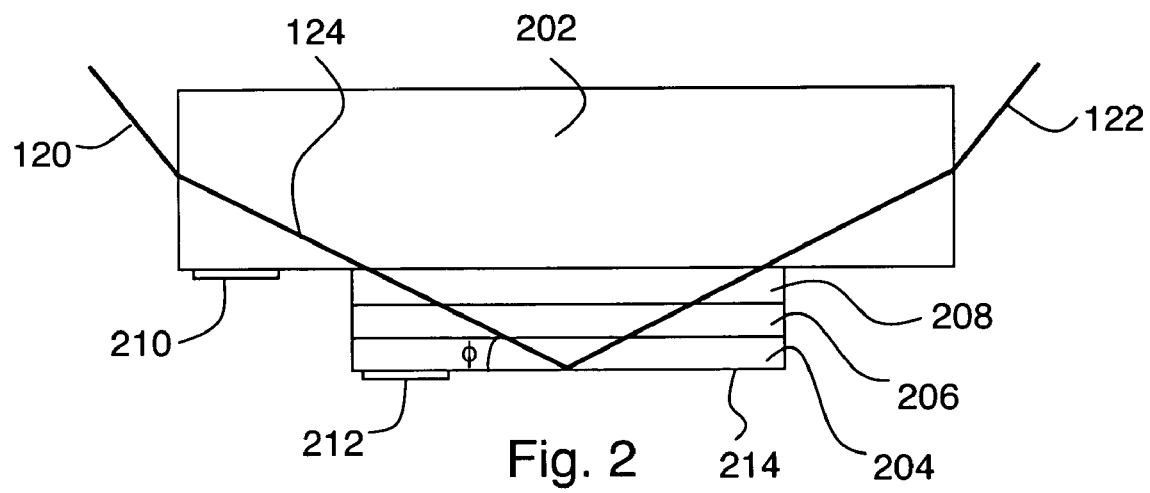
FIG. 2 shows an optical modulator according to a second embodiment of the invention.

FIG. 2 shows an optical modulator according to a preferred embodiment of the invention having a quantum well active region. In this example, the modulator includes a PIN diode having quantum wells in the I region. The PIN diode includes an n-type contact layer 204, an intrinsic region 206 including one or more quantum wells (not shown) separated by barriers, and a p-type buffer layer 208. This sequence of layers is grown or deposited on a p-type substrate (layer 208, followed by region 206, followed by layer 204). Electrical contact is provided by metal p-contact 210 and metal n-contact 212 respectively. Substrate 202 and layer 204, region 206 and layer 208 taken together make up a beam propagation structure 102 as in FIG. 1, with the combination of layer 204, region 206 and layer 208 acting as active region 110. The quantum wells of the I region are parallel to internally reflective face 214. Practice of the invention does not critically depend on doping, so it is possible to exchange p-type and n-type doping in this example and in any other embodiment of the invention.

For quantum well modulators, it is preferred, but not required, for the input polarization to be such that the optical electric field is in the plane of the quantum wells. This polarization couples to the heavy hole band in the quantum wells, thereby increasing electro-absorption and electro-refraction. In the example of FIG. 2, this preferred polarization with respect to the quantum wells is TE polarization with respect to the input and output faces. Thus the preferred polarization for the quantum wells is incompatible with Brewster incidence at the input and output in this example.

As a result of the reflection from reflective face 214, a standing wave pattern is formed that can extend through region 206, since the incident and reflected optical beams interfere where they spatially overlap. This standing wave pattern has periodic intensity minima (nodes) and maxima (antinodes) in an alternating pattern running parallel to reflective face 214. A quantum well disposed at or near a node of the standing wave pattern is minimally effective, while a quantum well at or near an antinode is maximally effective. Preferably the quantum wells are disposed away from the nodes, and more preferably the quantum wells are disposed substantially at the antinodes.

The period of the standing wave pattern is $\lambda/(2 n \sin \phi)$ for light having free space wavelength $\lambda$ in a medium of index n. The location of the nodes and antinodes with respect to reflective face 214 depends on the phase change incurred in reflection from face 214. Computation of this phase shift is well known in the art. As a simple example, for TE polarization, the phase shift is about 180° for shallow angle incidence, so face 214 is at or near a node of the standing wave pattern. The first antinode away from face 214 is at a distance of about $\lambda/(4 n \sin \phi)$ from face 214. One or more quantum wells of region 206 can be disposed at this location, provided layer 204 is sufficiently thin. The structure formed by layer 204, region 206 and layer 208 can include an optical resonant cavity, designed to resonate at the appropriate angle, to enhance this standing wave pattern and thereby improve modulator performance.

In one preferred embodiment, intrinsic region 206 includes InGaAs quantum wells separated by InP barriers, and substrate 202 is InP. This embodiment can be made to operate at wavelengths near 1.55 μm that are compatible with telecommunications applications. Another suitable material system is InGaAs quantum wells and InAlAs barriers on an InP substrate.

In another preferred embodiment, intrinsic region 206 includes Ge quantum wells separated by SiGe barriers, substrate 202 is Si, and buffer layer 208 is a SiGe buffer layer. This embodiment can be made to operate at wavelengths near 1.55 μm that are compatible with telecommunications applications, and can also be made compatible with standard silicon electronics processing. Alternatively, in this material system the Ge quantum wells can be replaced with $Si_{1-x}Ge_x$ quantum wells having x greater than about 0.7. Although such quantum wells have indirect band gaps, they also have Kane-like bands at the Brillouin zone center, making them suitable for use in optoelectronic devices such as modulators.

For Ge or SiGe quantum wells on a Si substrate, it is important to account for the 4% lattice mismatch between Si and Ge. In this embodiment, buffer layer 208 is preferably a Ge-rich SiGe layer having a lattice constant that matches the strain averaged lattice constant of intrinsic region 206. SiGe buffer layer 208 is preferably deposited at a relatively low growth temperature on Si substrate 202, then annealed at a higher annealing temperature to reduce defect density. Here the combination of substrate 202 and buffer layer 208 acts as a "device substrate" that is lattice matched to region 206. Such SiGe quantum wells and growth methods are described in greater detail in U.S. application Ser. No. 11/230,285.

Various geometrical configurations can be employed in practicing the invention where side access is employed for the input, the output, or both input and output.

Figure 3:
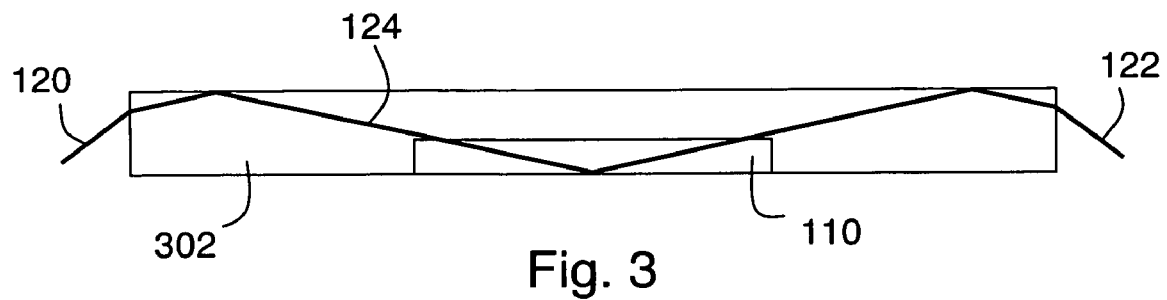
FIG. 3 shows an optical modulator according to an embodiment of the invention having multiple internal reflections.

FIG. 3 shows an optical modulator according to an embodiment of the invention having multiple internal reflections. Such an embodiment allows the use of a wider semiconductor chip 302. The top reflection can be a total internal reflection, or it can be provided by a reflective coating (e.g., a metal or a dielectric multi-layer). Any number of reflections can be employed in practicing the invention.

Figure 4:
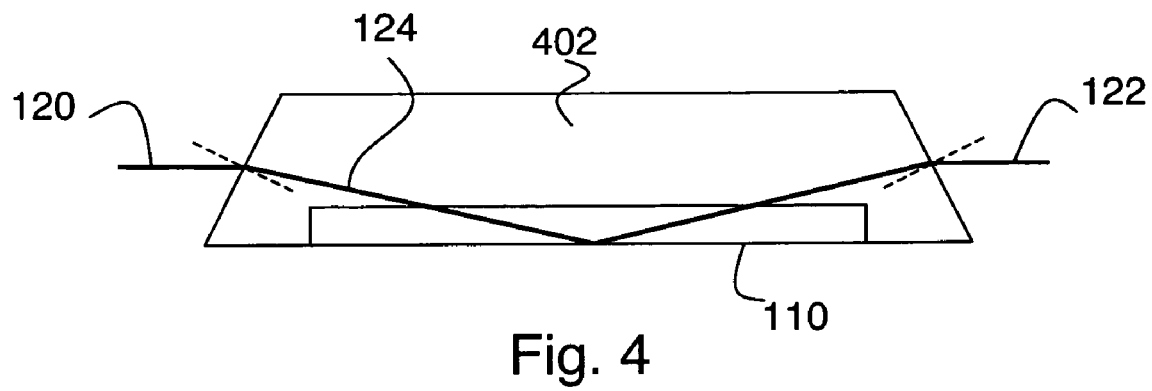
FIG. 4 shows an embodiment of the invention having tilted input and output faces to provide input and output beam parallelism.

FIG. 4 shows an embodiment of the invention having tilted input and output faces to provide input and output beam parallelism. In this embodiment, beam propagation structure 402 is like beam propagation structure 102 on FIG. 1 except that the input and output faces are tilted such that external beam paths 120 and 122 are parallel to reflective face 110. Such beam parallelism can facilitate optical coupling and/or integration with other devices or components. The example of FIG. 4 has both faces tilted. The invention can also be practiced by tilting only the input face, or only the output face, in this manner.

Figure 5:
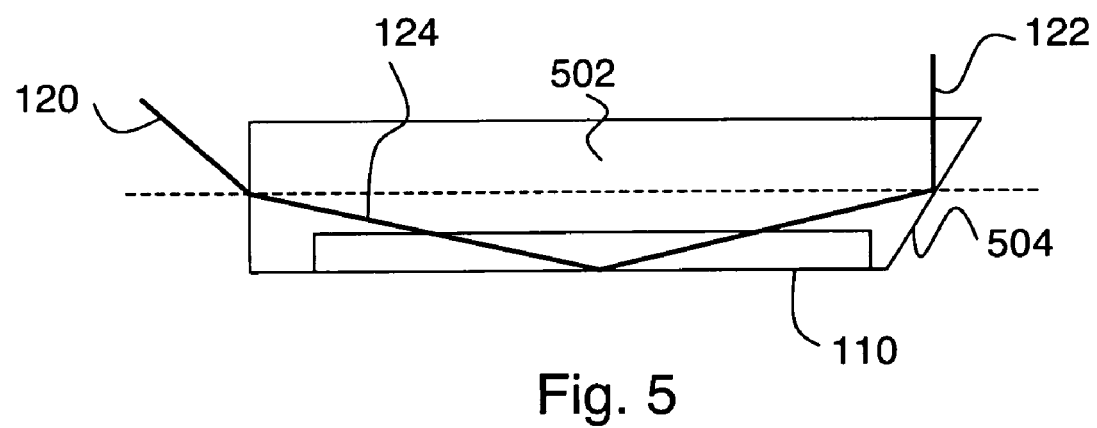
FIG. 5 shows an embodiment of the invention having a side input and a top output (or vice versa).

FIG. 5 shows an embodiment of the invention having a side input and a top output. In this embodiment, beam propagation structure 502 is like beam propagation structure 102 on FIG. 1 except that a second internal reflection from an angled side face 504 provides a surface normal output 122 for a side input 120. In this example, the output face is the top surface of beam propagation structure 502, and is parallel to reflective face 110. Alternatively, input and output can be interchanged so that surface normal input 122 can provide a side output 120. The side input or output face in this embodiment can be tilted as shown on FIG. 4 to provide an external beam path parallel to the internally reflective face. It is also possible for the reflection from angled side face 504 to provide surface normal output (or input) from face 110 of propagation structure 502 (i.e., from the bottom surface of the device).

The invention claimed is:

1. An electro-optic semiconductor device comprising:
a beam propagation structure having an input optical face and an output optical face distinct from the input optical face;
an active region disposed in the beam propagation structure and having an optical response, wherein the optical response can be altered by varying an electric field in the active region;
wherein the active region is disposed substantially parallel to an internally reflective face of the beam propagation structure;
wherein the beam propagation structure defines an internal optical beam path of an optical beam propagating within the device from the input face to the output face;
wherein the beam propagation structure defines an external optical beam path for light incident on the input optical face and for light emitted from the output optical face;
wherein the internal optical beam path includes a reflection from the internally reflective face of the beam propagation structure at an oblique angle of incidence;
wherein at least one of the input and output optical faces is not parallel to the internally reflective face;
wherein the optical beam path makes an oblique angle with respect to at least one of the input and output optical faces.

2. The device of claim 1, wherein said input optical face is disposed such that an input part of said external beam path is substantially parallel to said internally reflective face.

3. The device of claim 1, wherein said output optical face is disposed such that an output part of said external beam path is substantially parallel to said internally reflective face.

4. The device of claim 1, wherein a first one of said input and output optical faces is substantially parallel to said internally reflective face.

5. The device of claim 4, wherein a second one of said input and output optical faces is substantially perpendicular to said internally reflective face.

6. The device of claim 4, wherein a second one of said input and output optical faces is disposed such that a corresponding part of said external beam path is substantially parallel to said internally reflective face.

7. The device of claim 1, wherein said input and output optical faces are substantially perpendicular to said internally reflective face.

8. The device of claim 1, wherein one of said input and output optical faces is substantially perpendicular to said internally reflective face.

9. The device of claim 1, wherein said internal optical beam path includes only one reflection.

10. The device of claim 1, wherein said internal optical beam path includes two or more reflections.

11. The device of claim 10, wherein said beam propagation structure further comprises a top face substantially parallel to said internally reflective face, and wherein said two or more reflections are from said internally reflective face and from the top face.

12. The device of claim 1, wherein said optical beam is TM polarized relative to said input face and wherein a Brewster condition is satisfied at the input face.

13. The device of claim 1, wherein said optical beam is TM polarized relative to said output face and wherein a Brewster condition is satisfied at the output face.

14. The device of claim 1, wherein a physical mechanism relating said optical response to said electric field is selected from the group consisting of: quantum confined Stark effect, Wannier-Stark effect, Franz-Keldysh effect, electro-absorption, electro-refraction, and combinations thereof.

15. The device of claim 1, further comprising an optical resonant cavity to modify said optical response.

16. The device of claim 1, wherein said optical response is an amplitude response, a phase response, or combination thereof.

17. The device of claim 1, wherein said active region includes one or more quantum wells substantially parallel to said internally reflective face.

18. The device of claim 17, wherein said optical beam is polarized such that the optical electric field is substantially parallel to said one or more quantum wells.

19. The device of claim 17, wherein said one or more quantum wells are disposed substantially away from nodes of a standing wave pattern formed by said reflection from the internally reflective face.

20. The device of claim 19, wherein said one or more quantum wells are disposed substantially at antinodes of a standing wave pattern formed by said reflection from the internally reflective face.

21. The device of claim 17, wherein said one or more quantum wells comprise quantum wells having well/barrier layers selected from the group consisting of: InGaAs/InP, Ge/SiGe, and InGaAs/InAlAs.

22. The device of claim 17, wherein said one or more quantum wells comprise one or more $Si_{1-x}Ge_x$ wells having x greater than about 0.7.

23. The device of claim 22, wherein said active region has a strain-averaged lattice constant selected to provide an exact or approximate lattice match to an adjacent device substrate.

24. The device of claim 23, wherein the device substrate includes at least one annealed Ge-rich SiGe buffer layer deposited on a substrate.

* * * * *